(12) United States Patent
Schunke

(10) Patent No.: US 12,494,099 B2
(45) Date of Patent: Dec. 9, 2025

(54) SAFETY LOCKING DEVICE

(71) Applicant: SICK AG, Waldkirch (DE)

(72) Inventor: Stefan Schunke, Freiburg (DE)

(73) Assignee: SICK AG, Waldkirch (DE)

( * ) Notice: Subject to any disclaimer, the term of this patent is extended or adjusted under 35 U.S.C. 154(b) by 269 days.

(21) Appl. No.: 18/197,178

(22) Filed: May 15, 2023

(65) Prior Publication Data

US 2023/0386283 A1    Nov. 30, 2023

(30) Foreign Application Priority Data

May 24, 2022    (DE) .......................... 102022113080.0

(51) Int. Cl.
G07C 9/25 (2020.01)
G07C 9/10 (2020.01)

(52) U.S. Cl.
CPC .............. *G07C 9/253* (2020.01); *G07C 9/10* (2020.01)

(58) Field of Classification Search
None
See application file for complete search history.

(56) References Cited

U.S. PATENT DOCUMENTS

2016/0317908 A1    11/2016   Hughes
2016/0371908 A1    12/2016   Dow et al.

FOREIGN PATENT DOCUMENTS

| DE | 102008060004 A1 | * | 5/2010 | ............... F16P 3/10 |
|---|---|---|---|---|
| DE | 102015114717 A1 | | 3/2017 | |
| DE | 102018103772 A1 | | 8/2019 | |
| DE | 202019104521 U1 | | 10/2019 | |
| DE | 101010113499 A1 | | 11/2020 | |
| DE | 102020113499 A1 | | 11/2020 | |
| DE | 102008060004 B4 | | 9/2021 | |
| DE | 102020115307 A1 | * | 12/2021 | ............... F16P 3/08 |
| EP | 1936457 A1 | | 6/2008 | |
| EP | 2352948 A1 | | 5/2016 | |
| EP | 3474303 A1 | | 4/2019 | |
| EP | 3474304 A1 | | 4/2019 | |
| EP | 3499324 A1 | | 6/2019 | |
| EP | 3951516 A1 | | 2/2022 | |
| EP | 4152108 A1 | | 3/2023 | |

OTHER PUBLICATIONS

German Office Action dated Mar. 9, 2023 corresponding to application No. 10 2022 113 080.0.

* cited by examiner

*Primary Examiner* — K. Wong
(74) *Attorney, Agent, or Firm* — Nath, Goldberg & Meyer; Jerald L. Meyer

(57) ABSTRACT

A safety locking device for a movable guard serves to safeguard a machine. The safety locking device is configured to communicate with a safety control apparatus. The safety locking device comprises at least a first radio module for contactless communication with a portable operating unit. The safety locking device is configured to contactlessly receive a selected command from the portable operating unit and to transmit it to the safety control apparatus.

14 Claims, 8 Drawing Sheets

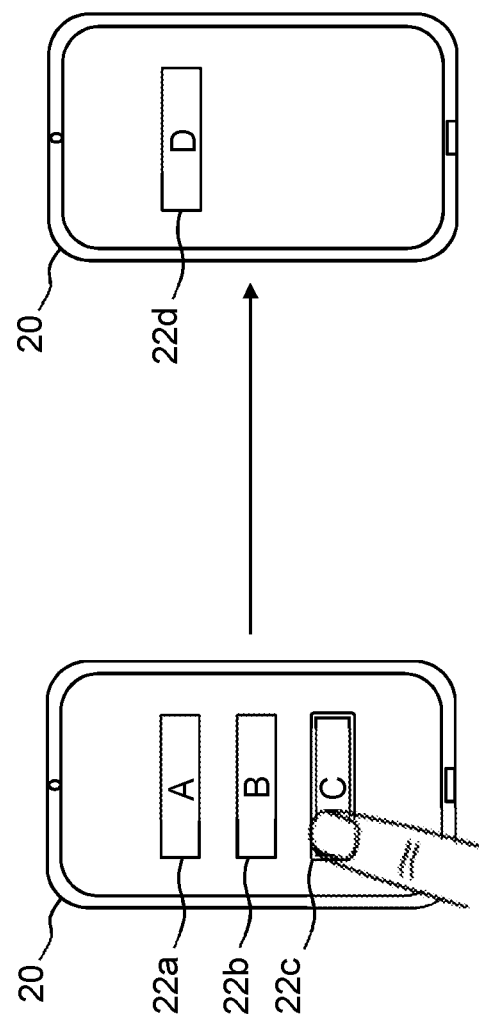

SAFETY LOCKING DEVICE

FIELD

The invention relates to a safety locking device for a movable guard for safeguarding a machine and to an assembly comprising such a safety locking device and a safety control apparatus and to a method for safeguarding a machine by means of a movable guard.

BACKGROUND

Safety locking devices are usually used to secure access to dangerous machines safeguarded by fences. In larger machines, safety locking devices are often developed as door systems, i.e. in addition to the "safety locking device" component, they also have an emergency stop button, further control keys and, if necessary, also a door handle and an escape release. If particularly large or complex plants are safeguarded, the number of control keys at such door systems often increases to three or more. This is necessary since various functions are intended to be controllable directly at the door that relate to access or to the machine operating mode, e.g. stop request of the machine, start of the setup operation, restart of the machine, restart, etc. As the number of buttons increases, the size of the housing of the safety locking device or of the door system increases. Furthermore, the costs and the likelihood of an incorrect operation increase. The complexity of the wiring (in the case of hard-wired keys) also increases. A modification of the plant, which for example goes hand in hand with the replacement of the dangerous machines, often also leads to a necessary retrofitting of the safety locking devices or the door systems. Depending on the deployment environment, the buttons of a conventional safety locking device or door system can also wear out quickly.

A safety locking device is, for example, known from DE 10 2008 060 004 B4. It comprises a plurality of input elements. This is accompanied by the disadvantages described above.

SUMMARY

It is therefore the object to provide a safety locking device that can be used more flexibly.

The object is satisfied by the safety locking device for a movable guard for safeguarding a machine, an assembly that includes such a safety locking device and a safety control apparatus, and a method for safeguarding a machine by means of a movable guard and such a safety locking device. The safety locking device is configured to communicate with a safety control apparatus and comprises at least a first radio module for contactless communication with a portable operating unit. The safety locking device is configured to contactlessly receive a selected command selected on the portable operating unit from a plurality of selectable commands from the portable operating unit and to transmit it to the safety control apparatus.

The safety locking device in accordance with the invention is in particular used for a movable guard (for example, a gate, a door, a flap or the like) to be able to safeguard a (dangerous) machine. The machine can, for example, be a robot and in particular a welding robot that is, for example, used in a production line. The safety locking device is configured to communicate with a safety control apparatus. The safety locking device is preferably connected to the safety control apparatus via a cable arrangement. The cable arrangement preferably comprises one or more cables or conductors. If the movable guard is open, the machine should preferably enter a stop operating mode. The safety locking device furthermore comprises at least a first radio module that is suitable for contactless communication with a portable operating unit (for example, a cell phone (smartphone), a tablet computer, a laptop computer, a smartwatch). The safety locking device is configured to contactlessly receive a selected command from the portable operating unit and to transmit it to the safety control apparatus.

Buttons can thereby be saved in the safety locking device and the safety locking device can be used very flexibly by using a corresponding radio module. If the safety locking device is used in a different environment, it receives the respective commands suitable for this environment via the radio module and forwards said commands to the safety control apparatus. In addition to a more compact design of the safety locking device, this also allows a very flexible use.

The safety locking device is preferably configured to communicate with the safety control apparatus via a safe communication interface such as PROFINET/PROFIsafe or IO-Link Safety.

In accordance with an advantageous embodiment, the safety locking device is configured to receive one or more (possible) executable commands from the safety control apparatus and to contactlessly transmit them to the portable operating unit. This brings with it the advantage that a user who carries the portable operating unit with him has a list comprising possible executable commands transmitted to the operating device. From these commands, the user can then select at least one command that is in turn transmitted by the safety locking device to the safety control apparatus and is executed by the latter. A replacement of the safety locking device with another safety locking device having a different number of buttons is therefore not necessary.

In accordance with another advantageous embodiment, the safety locking device is configured to contactlessly receive authentication information from the portable operating unit and to forward it to the safety control apparatus. The authentication information can, for example, be a self-portrait ("selfie") taken by the user which the user took with the portable operating unit. It can also be a fingerprint or a part of a fingerprint that was recorded by the portable operating unit. It can also be a PIN which the user entered via the portable operating unit. The authentication information can also be a user name or simply the information that the authentication took place successfully. To authenticate the user, the safety control apparatus could forward the authentication information to an authentication apparatus. The authentication could also be performed directly in the safety control apparatus, the safety locking device or even in the portable operating unit. The authentication in particular takes place by comparing the authentication information with a corresponding stored value.

In accordance with a further advantageous embodiment, the first radio module is an NFC radio module. The communication therefore takes place in the immediate vicinity (preferably in a range of less than 10 m, 8 m, 5 m, 3 m, 1 m or less than 0.5 m or 0.2 m) of the safety locking device. The safety locking device is preferably free of a WLAN module and/or a mobile radio module. For example, the communication between the safety locking device and the portable operating unit can take place via Bluetooth®, ZigBee®, or RFID. It is thereby ensured that the user only transmits selected commands to that safety locking device in front of which the user is currently located. Conversely, the user only receives (possible) executable commands from that safety locking device in front of which the user is currently located.

In accordance with a further advantageous embodiment, the safety locking device comprises an RFID tag, with the first radio module or a second radio module of the safety locking device being configured to receive data from the RFID tag if the movable guard is closed. The safety locking device is then configured to transmit the closed state of the movable guard to the safety control apparatus. The safety locking device would additionally or alternatively also be configured to transmit the open state of the movable guard (i.e. when no data are received from the RFID tag) to the safety control apparatus. The RFID tag is preferably movable and is thus arranged "travelling along" at the movable guard, whereas the remaining part of the safety locking device is arranged in a stationary manner. A blocking member is preferably likewise arranged traveling along at the movable guard, wherein the blocking member engages into an opening in the safety locking device in the closed state of the guard and is preferably locked in said opening by a locking element, in particular in the form of a pin. In this case, the safety control apparatus would preferably be configured to control the at least one machine to be safeguarded such that said machine is only activated if the movable guard is closed. If the movable guard is open, the safety control apparatus would preferably be configured to control the machine to be safeguarded such that said machine is out of operation.

The assembly in accordance with the invention comprises the safety locking device and the safety control apparatus. The safety control apparatus is configured to receive and to execute the selected command. The safety control apparatus is furthermore configured to transmit at least one currently executable command to the safety locking device in dependence on the executed command, with the safety locking device being configured to contactlessly transmit this at least one further currently executable command to the portable operating unit. The executable commands which are displayed on the portable operating unit and which the user can select are thereby updated. If the user, for example, selects the "machine stop" command, this command is transmitted via the safety locking device to the safety control apparatus. The safety control apparatus executes the command and then transmits the at least one further currently executable command. It is then possible for the user to have the "machine start" command displayed on his portable operating unit. It is particularly advantageous that only currently executable commands are transmitted to the safety locking device that in turn forwards them to the portable operating unit. The user will thereby only have currently valid commands displayed to him.

In accordance with a further advantageous embodiment of the assembly, the safety control apparatus is configured to check a permissibility of the received selected command. The received selected command will only be executed if it is permitted. For example, it could be possible for a user to have possible executable commands displayed to him from which he selects one, wherein a pushbutton of the safety locking device is simultaneously actuated and brings the safety control apparatus into a state in which the selected command cannot be executed. In such a case, a selected command would, for example, be classified as impermissible.

In accordance with a further advantageous embodiment of the assembly, the safety control apparatus is configured to transmit different executable commands to the safety locking device depending on the received authentication information of the portable operating unit. The safety locking device is itself configured to contactlessly forward these respective possible executable commands to the portable operating unit. Different users can thereby have different commands displayed to them. Thus, a command for a "machine stop" could, for example, be transmitted to each user so that this user can switch off the machine in a dangerous situation. On the other hand, the switching on of the machine is to be reserved only for certain users. Thus, there can be special users to whom, for example, the command for the "machine start" is displayed.

In accordance with a further advantageous embodiment of the assembly, the assembly comprises at least one portable operating unit. The portable operating unit is configured to contactlessly communicate with the safety locking device. The portable operating unit is further configured to receive executable commands from the safety locking device and to present them to a user. This "presentation" preferably takes place visually on a (preferably touch-sensitive) screen. However, the "presentation" could also take place through acoustic information.

In accordance with a further advantageous embodiment of the assembly, the portable operating unit is configured to detect a selection of a command by an input of a user and to contactlessly transmit the selected command to the safety locking device. This "detection" preferably takes place by detecting a contact of the touch-sensitive screen of the portable operating unit. The "detection" could, for example, also take place by actuating a corresponding button or pushbutton at the portable operating unit. The "detection" could likewise take place via voice recognition.

In accordance with a further advantageous embodiment of the assembly, the portable operating unit is configured to generate authentication information from the user and to contactlessly transmit this authentication information to the safety locking device. Depending on the safety locking device, this could be preceded by a corresponding request for generating authentication information. For example, it would be conceivable for the "machine stop" command to be displayed to all the users, i.e. also those who have not transmitted any authentication information to the safety locking device and thus to the safety control apparatus. Further commands could only be displayed to those users who have transmitted authentication information to the safety locking device and thus to the safety control apparatus and who could thereby be authenticated.

In accordance with a further advantageous embodiment of the assembly, the assembly comprises a door system, with the door system comprising the safety locking device. The door system furthermore comprises a main module having at least one pushbutton and a handle module having a door handle. The main module is preferably arranged in a stationary manner, whereas the handle module is arranged "traveling along" at the movable guard. The pushbutton is preferably an emergency stop button to be able to stop the machine. The door system preferably comprises only exactly two pushbuttons or one pushbutton. In the case of two pushbuttons, an emergency stop button and a reset button can be provided, for example. The door system and/or the main module can generally also have no button/no pushbutton at all. A pushbutton can also only be displayed on one display.

In accordance with a further advantageous embodiment of the assembly, the door system and the safety control apparatus are arranged in a common housing. A very compact design is thereby possible.

The method in accordance with the invention for safeguarding a machine by means of a movable guard comprises the following method steps. In a first method step, the portable operating unit is coupled to a safety locking device or to a door system comprising such a safety locking device. The wording "coupling" is in particular understood such that a possibility for data transmission between the portable operating unit and the safety locking device or the door system comprising the safety locking device is set up, i.e. established. In a second method step, possible executable commands are (contactlessly) transmitted to the portable operating unit. In a third method step, a command selected (by a user) is (contactlessly) transmitted from the portable operating unit to the safety locking device or to the door system comprising the safety locking device. In a fourth method step, the selected command is transmitted from the safety locking device or from the door system comprising the safety locking device to a safety control apparatus. In a fifth method step, the selected command is executed by the safety control apparatus. It is particularly advantageous that the user does not have to press a pushbutton at the safety locking device or at the door system comprising the safety locking device. It would thereby also be conceivable for the safety locking device to be attached in a higher or lower position in relation to the height of the user.

In accordance with a further advantageous embodiment of the method, in a sixth method step, it is determined which at least one command is currently executable after execution of the selected command. In the event that the "machine stop" command has been executed, this command cannot be executed again immediately. Thus, it could, for example, be determined that the "machine start" command and/or the "machine reset" command would be executable. In a seventh method step, this at least one currently executable command is transmitted to the safety locking device. This takes place by the safety control apparatus. Subsequently, the second method step is executed again, wherein the at least one currently executable command is (contactlessly) transmitted to the portable operating unit in this case. This at least one executable command is subsequently presented to the user by the portable operating unit.

BRIEF DESCRIPTION OF THE DRAWINGS

The invention will be described purely by way of example with reference to the drawings in the following. There are shown:

FIGS. 6A, 6B:
a selection of a command on the portable operating unit and an update of the possible executable commands on the portable operating unit.

DETAILED DESCRIPTION

Figure 1:
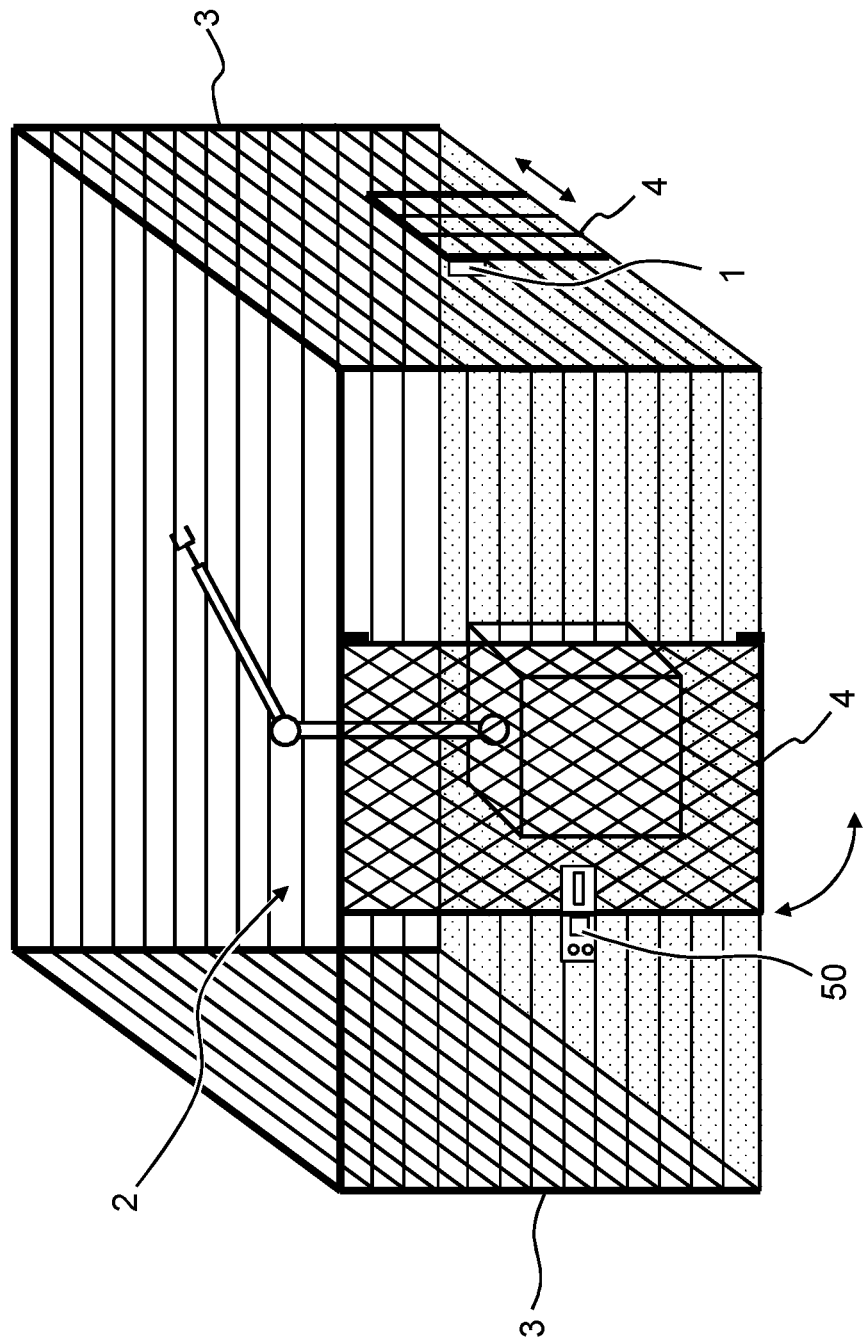
FIG. 1: an embodiment of two moveable guards for safeguarding a machine, that are closed via a safety locking device and a door system comprising a safety locking device.

FIG. 1 shows both a safety locking device 1 and a door system 50 comprising such a safety locking device 1. The safety locking device 1 and the door system 50 serve to safeguard a machine 2. Due to its spatial movement, the machine 2 poses a danger to the operating personnel so that the machine 2 is arranged within a cage 3. This cage 3 comprises one or more access points via which the operating personnel can enter the room or via which material can be fed to the machine 2 or via which material processed by the machine 2 can be removed. These access points can be closed by movable guards 4. In FIG. 1, the movable guard 4 is doors. However, they could also be gates or flaps. In this example, the safety locking device 1 is configured to safeguard a movable guard 4 in the form of a sliding door, whereas the door system 50 is configured to safeguard a movable guard 4 in the form of a revolving door.

Figure 2:
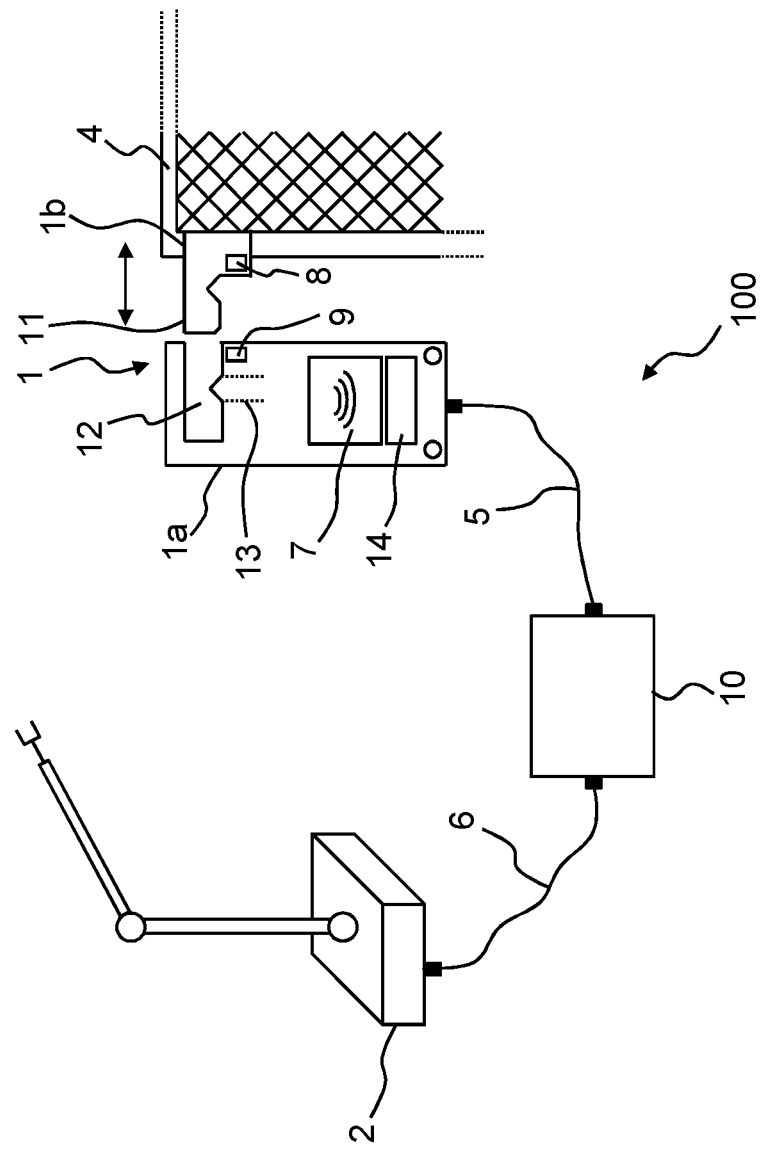
FIG. 2: an assembly comprising a safety locking device and a safety control apparatus that controls a machine.

FIG. 2 shows an assembly 100 comprising a safety locking device 1 and a safety control apparatus 10 that controls a machine 2. The safety locking device 1 is configured to communicate with the safety control apparatus 10. This communication in particular takes place via a first cable connection 5. The safety control apparatus 10 is furthermore configured to communicate with the machine 2. This communication in particular takes place via a second cable connection 6.

The safety control apparatus 10 could also be configured to control more than one machine 2 and/or to communicate with more than one safety locking device 1.

Figure 5:
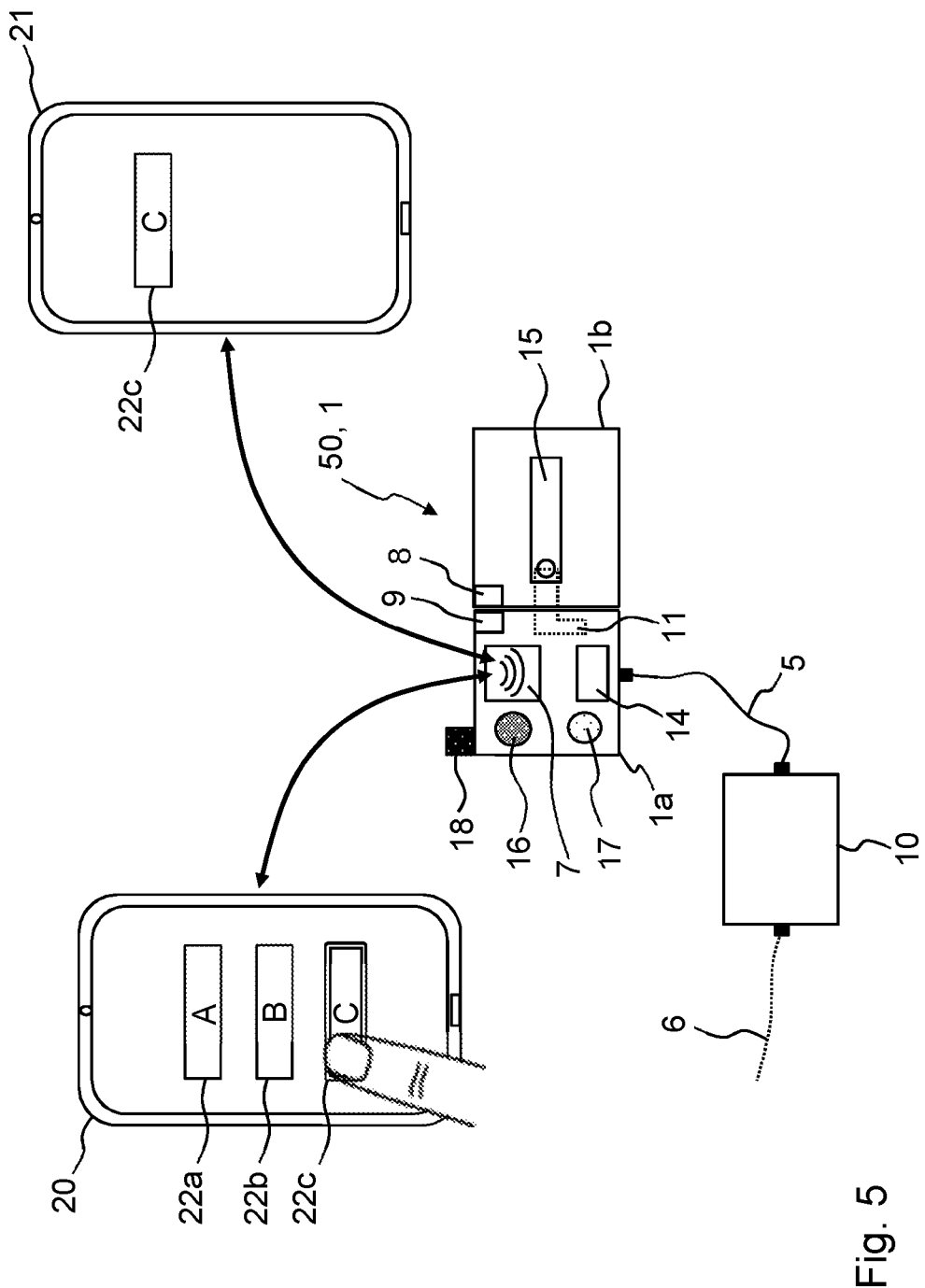
FIG. 5: an assembly comprising a safety locking device, a safety control apparatus, and two portable operating units.

The safety locking device 1 comprises a first radio module 7 that is configured to establish a contactless (wireless) communication with a portable operating unit 20 (see FIG. 5). The first radio module 7 in particular serves for communication in a near field zone. The first radio module 7 is therefore an NFC radio module. The communication between the first radio module 7 and the portable operating unit which a user holds, should only take place when the user is in the immediate vicinity of the safety locking device 1. The wording "in the immediate vicinity" requires that the user preferably stands less than 10 m, 8 m, 5 m or less than 3 m, 1 m or 0.5 m away from the safety locking device 1. The first radio module 7 is preferably free of a mobile radio chip or a WLAN chip.

The power supply of the safety locking device 1 can, for example, take place via the safety control apparatus 10 or via a separate supply line. The safety locking device 1 preferably comprises an RFID tag 8. The first radio module 7 or a second radio module 9 (see FIG. 2) is configured to receive data from the RFID tag 8 when the movable guard 4 is closed. The safety locking device 1 preferably comprises a first part 1a that is arranged in a stationary manner and a second part 1b that is movable or that travels along at the movable guard 4. The RFID tag 8 is preferably arranged at the second part 1b, wherein the second part 1b is connected, in particular screwed, to the movable guard 4. The second part 1b of the safety locking device 1 furthermore comprises a blocking member 11 that, in the closed state of the moveable guard 4, engages into an opening 12 in the first part 1a of the safety locking device 1 and is preferably locked in this opening 12 by a locking element 13, in particular in the form of a pin.

The safety locking device 1 is configured to transmit a closed state of the movable guard 4 to the safety control apparatus 10 in the case that data can be received from the RFID tag 8 via the second radio module 9. For the other case, i.e. when no data can be received from the RFID tag 8 via the second radio module 9, the safety locking device 1 is configured to transmit an open state of the movable guard 4 to the safety control apparatus 10. In this case, the safety control apparatus 10 is preferably configured to control the machine 2 such that the latter stops (machine stop).

The safety locking device 1 preferably also comprises a data processing unit 14 that is configured to receive data of the first and second radio module 7, 9 and to undertake the communication with the safety control apparatus 10. The data processing unit 14 could furthermore be configured to transmit data to the first radio module 7.

Figure 3:
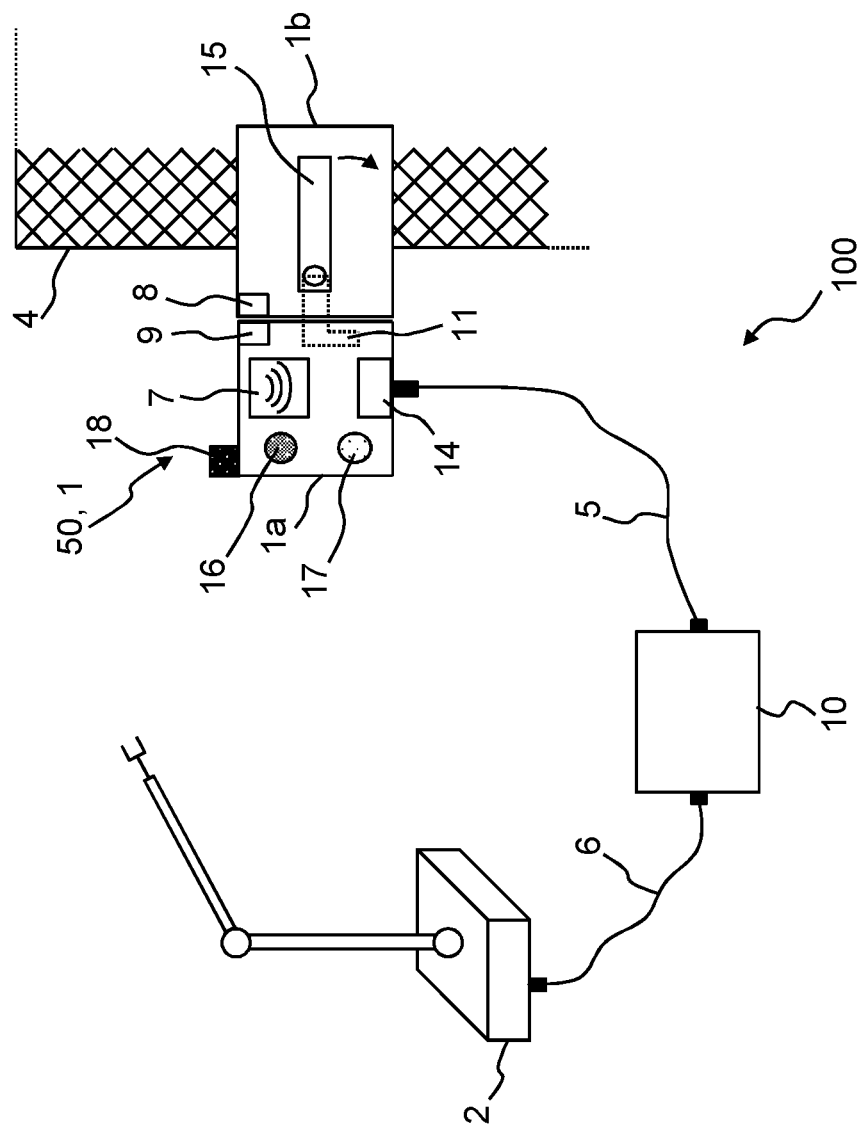
FIG. 3: an assembly comprising a door system that has a safety locking device and a safety control apparatus that controls a machine.

A door system 50 that comprises the safety locking device 1 is shown in FIG. 3. Therefore, in this embodiment, the door system 50 likewise comprises a first part 1a and a second part 1b. The second part 1b is arranged traveling along at the movable guard 4. The first part 1a preferably comprises a first pushbutton 16 or exactly one (single) first pushbutton 16. The first pushbutton 16 is preferably an emergency stop button via which the "machine stop" command is transmitted to the safety control apparatus 10 that in turn ensures that the machine 2 is stopped immediately. Optionally, the first part 1a could also comprise a second pushbutton 17. This second pushbutton 17 is preferably a reset button to transfer the stopped machine 2 into an operating mode again. Optionally, the first part 1a can also have a visual display 18 that is in particular designed in the form of one or more LEDs. The current operating state of the machine 2 or of the door system 50 can be displayed to the operating personnel via the visual display 18. For this purpose, the visual display 18 can e.g. use different colors. The second part 1b comprises a door handle 15. The door handle 15 can in particular be actuated when the safety control apparatus 10 has stopped the machine 2 and has transmitted an unlocking command to the door system 50. What is not shown is an optional escape release that is in particular arranged at the rear side of the door system 50 and that allows the operating personnel to also open the door system 50 from the interior of the cage 3. In the event that the escape release is actuated, the door system 50 is in particular configured to transmit the "machine stop" command to the safety control apparatus 10 that in turn stops the machine 2. The first part 1b can also be referred to as the main module, whereas the second part 1b can also be referred to as the handle module.

Figure 4:
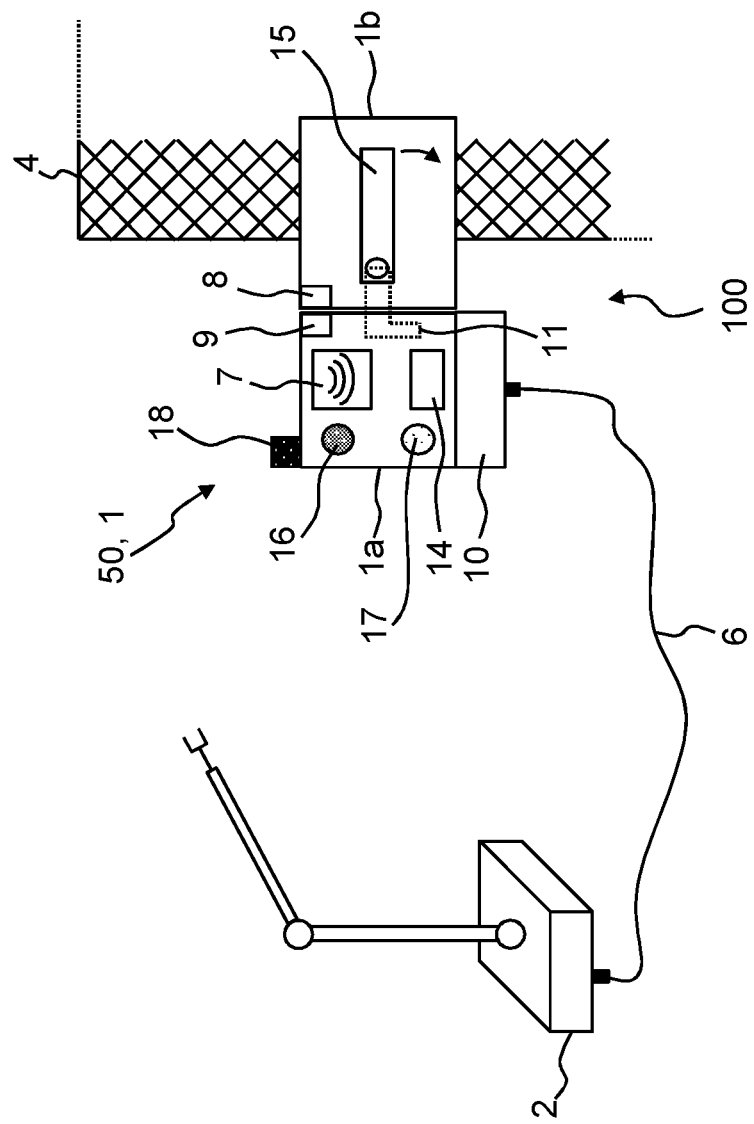
FIG. 4: a joint integration of a door system and a safety control apparatus.

FIG. 4 shows a further embodiment of the assembly 100 in accordance with the invention. In this case, the door system 50 and the safety control apparatus 10 are arranged in a common housing. The data processing unit 14 preferably continues to be part of the safety locking device 1 and thus continues to be part of the door system 50. It would generally likewise be conceivable for the data processing unit 14 to belong to the safety control apparatus 10. It would likewise be conceivable for the data processing unit 14 to additionally act as the data processing unit 14 of the safety control apparatus 10. In this case, the safety locking device 1 and thus the door system 50 and the safety control apparatus 10 would have a common data processing unit 14. The data processing unit 14 can be configured as a microcontroller and/or an FPGA and/or a processor.

FIG. 5 shows a further embodiment of the assembly 100 in accordance with the invention. In the following, it will be explained how the communication between the safety locking device 1 or the door system 50 comprising the safety locking device and a portable operating unit 20 works. It is pointed out that the assembly 100 can comprise either a safety locking device 1 or a door system 50 comprising a corresponding safety locking device 1.

All the statements that are made below and in particular relate to the communication with the portable operating unit 20 apply both to the use of the safety locking device 1 and to the use of the door system 50 that comprises such a safety locking device 1.

The portable operating unit 20 is configured to couple to the safety locking device 1 or to the door system 50 when the portable operating unit 20 is brought into the vicinity of the safety locking device 1 or into the vicinity of the door system 50. This can take place automatically or only after a user has started an appropriate software application on the portable operating unit 20. Once the coupling process has been completed, data can be exchanged between the safety locking device 1 or the door system 50 and the portable operating unit 20 in a contactless (wireless) (bidirectional) manner.

The safety locking device 1 or the door system 50 is configured to receive one or more executable commands 22a, 22b, 22c from the safety control apparatus 10 and to contactlessly transmit them to the portable operating unit 20.

The portable operating unit 20 is configured to present said one or more executable commands 22a, 22b, 22c to a user. In FIG. 5, the presentation takes place by a display on a preferably touch-sensitive screen of the portable operating unit 20. Different commands 22a, 22b, 22c can, for example, be presented by different colors and/or sizes. For example, the "machine stop" command could be presented larger and in a different color than the other commands.

The user can now select one or more of the executable commands 22a, 22b, 22c. This selection, for example, takes place by tapping on a specific area (e.g. a button) of the screen in the software application as is represented by the finger in FIG. 5. The portable operating unit 20 is configured to recognize the selection (which optionally still has to be confirmed by the user (the confirmation may also require the entry of a credential such as a password, a fingerprint, a facial scan)). The portable operating unit 20 is furthermore configured to contactlessly transmit the one or more selected commands 22a, 22b, 22c to the safety locking device 1 or the door system 50 (comprising the safety locking device 1).

The safety locking device 1 or the door system 50 is configured to receive the one or more selected commands 22a, 22b, 22c from the portable operating unit 20 and to transmit them to the safety control apparatus 10.

The safety control apparatus 10 is configured to execute the one or more commands 22a, 22b, 22c and, for example, to stop or to start the machine 2.

The safety locking device 1 or the door system 50 are optionally also configured to transmit possible error conditions to the portable operating unit 20. The portable operating unit 20 is then configured to present these possible error conditions to the user, in particular to display them on the screen. A possible error condition is, for example, the case according to which the movable guard 4 is not closed, i.e. when no data are transmitted from the RFID tag 8 to the first or second radio module 7, 9 when the RFID tag 8 is used. The user can search for errors in a targeted manner by means of such an error condition.

The safety control apparatus 10 is preferably likewise configured to check the permissibility of the one or more selected commands 22a, 22b, 22c before they are executed.

Yet a further portable operating unit 21 is shown in FIG. 5. This further portable operating unit 21 is also coupled to the safety locking device 1 or to the door system 50 and is configured to exchange data with the safety locking device 1 or the door system 50. It can be seen that the further portable operating unit 21 displays fewer selectable commands 22c on the screen than the portable operating unit 20.

The assembly 100 therefore preferably allows, depending on the authorization of the user, the respective portable operating unit 20, 21 to present executable commands 22a, 22b, 22c that correspond to the authorization of the user. A user who is responsible for the operation of the machine preferably also has, in addition to the "machine stop" command, the command for a "machine reset" or "machine start" displayed to him, whereas a user who is responsible for the cleaning of the premises preferably only has the "machine stop" command displayed to him.

The portable operating unit 20 is therefore configured to generate authentication information and to transmit it to the safety locking device 1 or the door system 50. The safety locking device 1 or the door system 50 is configured to transmit this authentication information to the safety control apparatus 10.

The safety control apparatus 10 is preferably configured to execute a selected command 22a, 22b, 22c only when the user has been authenticated based on the authentication information.

The safety control apparatus 10 is preferably configured, depending on the received authentication information or the authentication of the user that took place through this authentication information, to transmit different executable commands 22a, 22b, 22c to the safety locking device 1 or the door system 50, wherein the safety locking device 1 or the door system 50 is configured to contactlessly transmit these respective possible executable commands 22a, 22b, 22c to the portable operating unit 20.

FIGS. 6A and 6B show how the selectable commands 22a, 22b, 22c are updated after the selection of a command 22a, 22b, 22c on the portable operating unit 20. For example, in FIG. 6A, the user has three commands 22a, 22b, 22c available for selection on the portable control device 20 from which the user selects the third command 22c. The portable operating unit 20 is configured to (contactlessly) transmit this third command 22c to the safety locking device 1 or the door system 50, wherein the safety locking device 1 or the door system 50 is in turn configured to transmit this third command to the safety control apparatus 10. The safety control apparatus 10 is configured to execute this third command. The safety control apparatus 10 is further configured to transmit at least one currently (further) executable command 22d to the safety locking device 1 or the door system 50 in dependence on the executed command 22c, wherein the safety locking device 1 or the door system 50 is configured to contactlessly transmit this further currently executable command 22d to the portable operating unit 20. This further currently executable command 22d is presented by the portable operating unit 20 on the (touch-sensitive) screen in accordance with FIG. 6B.

The portable operating unit 20 is therefore configured to update the list comprising executable commands 22a, 22b, 22c after selecting an executable command 22a, 22b, 22c. This update in particular takes place such that only further commands 22d that can be executed in response to the already selected and executed command 22a, 22b, 22c are displayed in the following. If the "machine stop" command has been selected and executed, this command cannot be selected and executed again. Instead, the "machine start" command can now be selected in the following.

It is generally possible that the portable operating unit 20 is configured to display certain commands 22a, 22b, 22c only on certain days and/or at certain times.

The safety control apparatus 10 could be configured to receive a list comprising possible executable commands directly from the at least one machine 2. The installation of the safety locking device 1 or the door system 50 could thereby take place particularly easily. Thus, the safety locking device 1 or the door system 50 would only have to be connected to the safety control apparatus 10, wherein the safety control apparatus 10 is connected to the corresponding machine 2. In the following, only valid commands, and thus commands that can be executed at all, can be transmitted from the machine 2 via the safety control apparatus 10 and the safety locking device 1 or the door system 50 to the portable operating unit 20.

The safety control apparatus 10 could also still be connected to a higher-ranking control center via which the corresponding authorizations for the users can be transmitted. The control center could also be configured to authenticate a user accordingly after the safety control apparatus 10 has forwarded the authentication information to the control center accordingly.

It would also be conceivable that a user can request a command 22a, 22b, 22c. The portable operating unit 20 would then be configured to transmit this command request to the safety locking device 1 or the door system 50. The safety locking device 1 or the door system 50 is in turn configured to transmit the command request to the safety control apparatus 10. The safety control apparatus 10 is configured to transmit the command request to the control center. There, a decision can be made whether the user is to have the authorization to execute such a requested command once, multiple times, or continuously or within a certain time interval, or not. If this is decided in the affirmative, the control center communicates this to the safety control apparatus 10, wherein the safety control apparatus 10 in turn communicates this to the safety locking device 1 or the door system 50, and wherein the safety locking device 1 or the door system 50 in turn communicates this to the portable operating unit 20 that now presents this permitted selectable command 22a, 22b, 22c to the user.

Figure 7A:
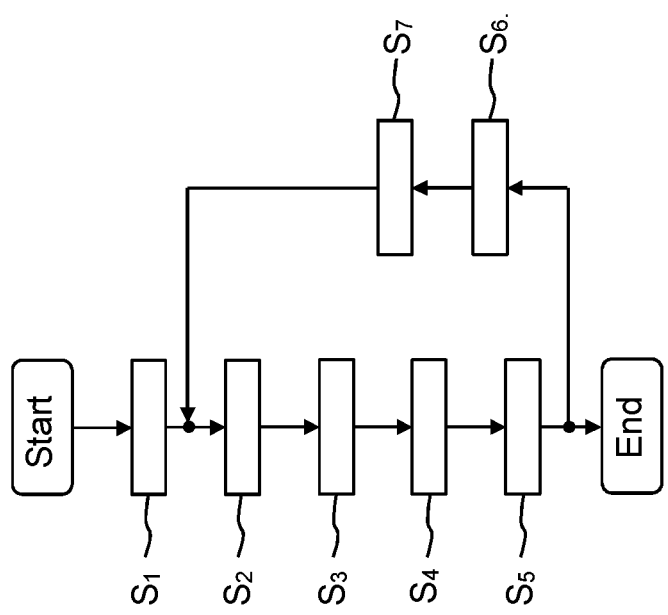
FIGS. 7A, 7B: different methods for safeguarding a machine by means of a movable guard.

FIG. 7A shows an embodiment of the method in accordance with the invention for safeguarding the machine 2 by means of the movable guard 4.

In a first method step $S_1$, the portable operating unit 20 is coupled to the safety locking device 1 or the door system 50 so that a data exchange is (contactlessly) possible. In a second method step $S_2$, possible executable commands 22a, 22b, 22c are (contactlessly) transmitted to the portable operating unit 20 and are presented by this portable operating unit. In a third method step $S_3$, a selected command 22a, 22b, 22c is transmitted from the portable operating unit 20 to the safety locking device 1 or to the door system 50. In a fourth method step $S_4$, the selected command 22a, 22b, 22c is transmitted from the safety locking device 1 or from the door system 50 to the safety control apparatus 10. In a fifth method step $S_5$, the selected command 22a, 22b, 22c is executed by the safety control apparatus 10.

Optionally, following the fifth method step $S_5$, in a sixth method step $S_6$, it can be determined which at least one command 22d is currently executable after execution of the selected command 22a, 22b, 22c.

In a seventh method step $S_7$, the at least one currently executable command 22d can be transmitted to the safety locking device 1 or the door system 50. Subsequently, the method steps $S_2$ to $S_5$ would be repeated with respect to the at least one currently executable command 22d.

Figure 7B:
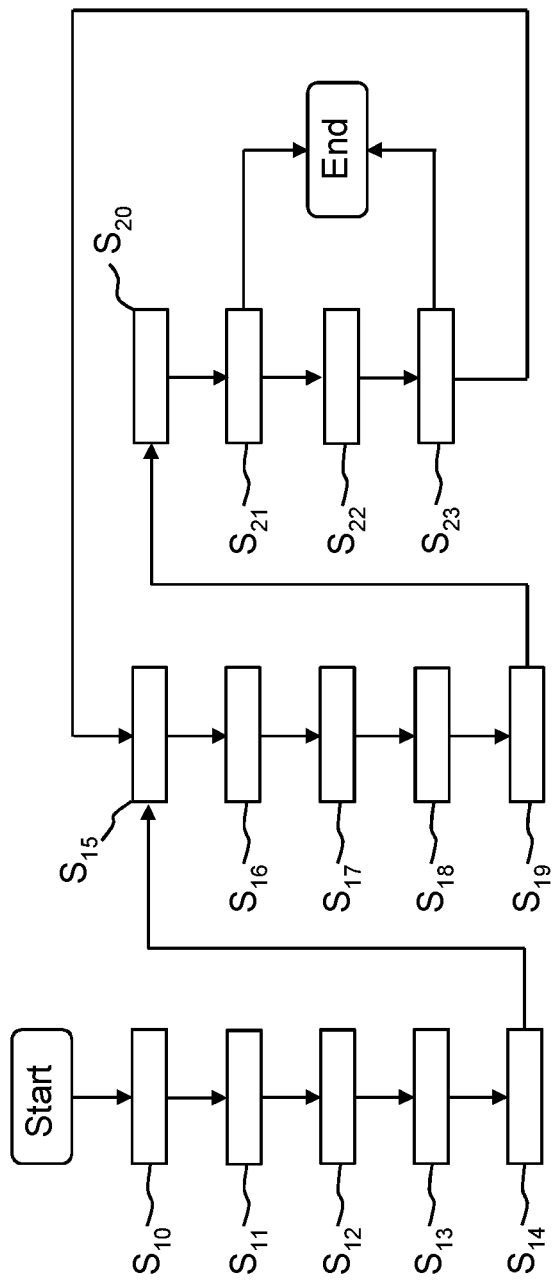

FIG. 7B shows a further embodiment of the method in accordance with the invention for safeguarding the machine 2 by means of the movable guard 4. The method of FIG. 7B includes further details compared to the method of FIG. 7A.

In the method step $S_{10}$, a software application is started on the portable operating unit 20. In the method step $S_{11}$, the portable operating unit 20 is brought into the immediate vicinity or reading range of the first radio module 7 or of the antenna that is connected to the first radio module 7. In the method step $S_{12}$, the portable operating unit 20 is coupled to the safety locking device 1 or the door system 50. In the method step $S_{13}$, status information is transmitted from the safety locking device 1 or the door system 50 to the portable operating unit 20. In the method step $S_{14}$, the safety locking device 1 or the door system 50 communicates to the safety control apparatus 10 that a portable operating unit 20 is coupled to the safety locking device 1 or the door system 50. In the method step $S_{15}$, the safety control apparatus 10 communicates at least one or more possible currently executable commands 22a, 22b, 22c to the safety locking device 1 or the door system 50. Therefore, commands 22a, 22b, 22c are transmitted that can be executed in the current state of the safety control apparatus 10. In the method step $S_{16}$, the at least one or more possible currently executable commands 22a, 22b, 22c are transmitted to the portable operating unit 20. In the method step $S_{17}$, the at least one or more possible currently executable commands 22a, 22b, 22c are displayed on the (e.g. touch-sensitive) screen of the portable operating unit 20. In the method step $S_{18}$, one or more possible currently executable commands 22a, 22b, 22c are selected (by a user). In the method step $S_{19}$, the at least one or more possible currently selected commands 22a, 22b, 22c are transmitted from the portable operating unit 20 to the safety locking device 1 or to the door system 50. In the method step $S_{20}$, the at least one or more possible currently selected commands 22a, 22b, 22c are transmitted from the safety locking device 1 or the door system 50 to the safety control apparatus 10. In the method step $S_{21}$, the at least one or more possible currently selected commands 22a, 22b, 22c are checked for permissibility by the safety control apparatus 10. If the at least one or more possible currently selected commands 22a, 22b, 22c are impermissible, they are not executed and the method is preferably terminated. In general, in this case, a message could be transmitted back to the portable operating unit 20 in which the user is informed that the at least one or more possible currently selected commands 22a, 22b, 22c have been discarded as impermissible and have not been executed. In the method step $S_{22}$, in the event that the at least one or more possible currently selected commands 22a, 22b, 22c have been deemed to be permitted, the at least one or more possible currently selected commands 22a, 22b, 22c are executed by the safety control apparatus 10. In the method step $S_{23}$, the safety control apparatus 10 updates the system status and/or determines which at least one command 22d is now executable with respect to the at least one or more executed commands 22a, 22b, 22c. The method step $S_{15}$ is continued in the following.

In general, it is particularly advantageous that lower manufacturing costs arise through the use of the safety locking device 1 in accordance with the invention or the door system 50 in accordance with the invention, in particular since the number of control keys decreases. Furthermore, the invention can be integrated in a smaller housing. The robustness compared to previous solutions likewise increases. This in particular applies with respect to the IP degree of protection in terms of the vibration resistance. Furthermore, the safety locking device 1 in accordance with the invention or the door system 50 in accordance with the invention can be cleaned more easily. Furthermore, no wear of pushbuttons takes place since they are either not used or only rarely used. There is also a high degree of flexibility when specifying and also changing the number and function of the commands 22a, 22b, 22c provided. In addition, the probability of an incorrect operation is reduced by the use of the safety locking device 1 in accordance with the invention or of the door system 50 in accordance with the invention since there is a possibility of blocking pushbuttons or only permitted commands 22a, 22b, 22c are displayed depending on the state of the machine 2. A further advantage of the safety locking device 1 in accordance with the invention or of the door system 50 in accordance with the invention exists since a rights management can be introduced so that different users can execute different commands 22a, 22b, 22c. An unauthorized actuation of pushbuttons can therefore be avoided. Furthermore, an advantage of the safety locking device 1 in accordance with the invention or of the door system 50 in accordance with the invention exists since users can use already present (personal) portable operating units 20, in the form of smartphones, for operation. An additional advantage exists since the selectable commands 22a, 22b, 22c on the portable operating unit 20 can be highlighted by different colors by the portable operating unit 20. In general, the stock-keeping is also simplified since only one type of the safety locking device 1 or only one type of the door system 50 in accordance with the invention has to be kept in stock. In the event of a defect of a safety locking device 1 or of a door system 50, a replacement can take place very simply. Furthermore, the wiring is simpler than in the prior art since the selectable commands 22a, 22b, 22c or the selected commands 22a, 22b, 22c are transmitted in the form of a digital data stream between the safety locking device 1 or the door system 50 and the portable operating unit 20 and/or the safety control apparatus 10.

It would generally, however, also be conceivable to protect the door system 50. In one non-limiting aspect, a door system 50 is provided for a movable guard 4 for safeguarding a machine 2, wherein the door system 50 is configured to communicate with a safety control apparatus 10, and wherein the door system 50 comprises at least a first radio module 7 for contactless communication with a portable operating unit 20, wherein the door system 50 is configured to contactlessly receive a selected command 22a, 22b, 22c from the portable operating unit 20 and to transmit it to the safety control apparatus 10. By way of non-limiting example, the door system 50 furthermore comprises a main module 1a having at least one pushbutton 16, 17 and a handle module 1b having a door handle 15.

The door system 50 could generally also be introduced such that it only comprises the safety locking device 1. Accordingly, by non-limiting example, the door system 50 with the safety locking device 1 is configured in which the door system 50 comprises a main module 1a having at least one pushbutton 16, 17 and a handle module 1b having a door handle 15.

In a further aspect, a computer program comprises commands that, when the program is executed by a computer, cause the computer to perform the described operations.

The invention is not restricted to the embodiments described. Within the scope of the invention, all the described and/or drawn features can be combined with one another in any desired manner.

REFERENCE NUMERAL LIST safety locking device 1
first part (main module) 1*a*
second part (handle module) 1*b*
machine 2
cage 3
movable guards 4
first cable connection 5
second cable connection 6
first radio module 7
RFID tag 8
second radio module 9
safety control apparatus 10
blocking member 11
opening 12
locking element 13
data processing unit 14
door handle 15
first pushbutton (emergency stop button) 16
second pushbutton (reset button) 17
visual display (LED) 18
portable operating unit 20
further portable operating unit 21
executable commands 22*a*, 22*b*, 22*c*, 22*d*
door system 50
assembly 100

The invention claimed is:

1. A safety locking device for a movable guard for safeguarding a machine,
    wherein the safety locking device is configured to communicate with a safety control apparatus and wherein the safety locking device comprises at least a first radio module for contactless communication with a portable operating unit,
    wherein the safety locking device is configured to contactlessly receive a command selected by a user on the portable operating unit from a plurality of selectable commands from the portable operating unit and to transmit it to the safety control apparatus,
    wherein the safety locking device is configured to communicate with the safety control apparatus and wherein the safety locking device comprises at least a first radio module for contactless communication with a portable operating unit,
    wherein the safety locking device is configured to contactlessly receive the selected command from the portable operating unit and to transmit it to the safety control apparatus,
    wherein the safety control apparatus is configured to receive and to execute the selected command,
    and wherein the safety control apparatus is further configured to transmit at least one currently executable command to the safety locking device in dependence on the executed command, with the safety locking device being configured to contactlessly transmit this further currently executable command to the portable operating unit.

2. The safety locking device in accordance with claim 1,
    wherein the safety locking device is configured to contactlessly receive authentication information from the portable operating unit and to forward it to the safety control apparatus.

3. The safety locking device in accordance with claim 1,
    wherein the first radio module is an NFC radio module.

4. The safety locking device in accordance with claim 1,
    wherein the safety locking device comprises an RFID tag, with the first radio module or a second radio module of the safety locking device being configured to receive data from the RFID tag if the movable guard is closed, and with the safety locking device being configured to transmit the closed state of the movable guard to the safety control apparatus.

5. An assembly comprising a safety locking device and a safety control apparatus,
    wherein the safety locking device is configured to communicate with the safety control apparatus and wherein the safety locking device comprises at least a first radio module for contactless communication with a portable operating unit, wherein the safety locking device is configured to contactlessly receive a command selected on the portable operating unit from a plurality of selectable commands from the portable operating unit and to transmit it to the safety control apparatus,
    wherein the safety control apparatus is configured to receive and to execute the selected command, and wherein the safety control apparatus is further configured to transmit at least one currently executable command to the safety locking device in dependence on the executed command, with the safety locking device being configured to contactlessly transmit this further currently executable command to the portable operating unit,
    wherein the safety locking device is configured to communicate with the safety control apparatus and wherein the safety locking device comprises at least a first radio module for contactless communication with a portable operating unit,
    wherein the safety locking device is configured to contactlessly receive the selected command from the portable operating unit and to transmit it to the safety control apparatus,
    wherein the safety control apparatus is configured to receive and to execute the selected command,
    and wherein the safety control apparatus is further configured to transmit at least one currently executable command to the safety locking device in dependence on the executed command, with the safety locking device being configured to contactlessly transmit this further currently executable command to the portable operating unit.

6. The assembly in accordance with claim 5,
    wherein the safety control apparatus is configured to check a permissibility of the received selected command, with the received selected command only being executed if it is permitted.

7. The assembly in accordance with claim 5,
    wherein the safety control apparatus is configured to transmit different executable commands to the safety locking device depending on the received authentication information of the portable operating unit, with the safety locking device being configured to contactlessly transmit these respective possible executable commands to the portable operating unit.

8. The assembly in accordance with claim 5,
    wherein the assembly comprises at least one portable operating unit, with the portable operating unit being configured to contactlessly communicate with the safety locking device, and with the portable operating unit further being configured to receive selectable commands from the safety locking device and to present them to a user.

9. The assembly in accordance with claim 8,
wherein the portable operating unit is configured to detect a selection of a selectable command by an input of the user and to contactlessly transmit the selected command to the safety locking device.

10. The assembly in accordance with claim 8,
wherein the portable operating unit is configured to generate authentication information from the user and to contactlessly transmit this authentication information to the safety locking device.

11. The assembly in accordance with claim 5,
wherein the assembly has a door system, with the door system comprising the safety locking device, and with the door system comprising a main module having at least one pushbutton and a handle module having a door handle.

12. The assembly in accordance with claim 11,
wherein the door system and the safety control apparatus are arranged in a common housing.

13. A method for safeguarding a machine by means of a movable guard, the method comprising the following steps:
coupling a portable operating unit to a safety locking device or to a door system comprising a safety locking device;
transmitting possible executable commands to the portable operating unit;
receiving a user selection made by a user on the portable operating unit from a plurality of selectable commands;
transmitting the command selected by a user on the portable operating unit to the safety locking device or to the door system comprising the safety locking device;
transmitting the selected command from the safety locking device or from the door system comprising the safety locking device to a safety control apparatus; and
executing the selected command by the safety control apparatus,
wherein the safety locking device is configured to communicate with the safety control apparatus and wherein the safety locking device comprises at least a first radio module for contactless communication with a portable operating unit,
wherein the safety locking device is configured to contactlessly receive the selected command from the portable operating unit and to transmit it to the safety control apparatus, wherein the safety control apparatus is configured to receive and to execute the selected command,
and wherein the safety control apparatus is further configured to transmit at least one currently executable command to the safety locking device in dependence on the executed command, with the safety locking device being configured to contactlessly transmit this further currently executable command to the portable operating unit.

14. The method in accordance with claim 13, further comprising the following steps:
determining which at least one command is currently executable after execution of the selected command;
transmitting the at least one currently executable command to the safety locking device or to the door system comprising the safety locking device by the safety control apparatus;
transmitting the at least one currently executable command to the portable operating unit by the safety locking device or by the door system comprising the safety locking device; and
presenting the at least one currently executable command by the portable operating unit.

* * * * *